United States Patent
Tanaka et al.

(10) Patent No.: US 8,121,878 B2
(45) Date of Patent: Feb. 21, 2012

(54) EXECUTION DECISION SUPPORT PROGRAM AND DEVICE OF REGULATION MEASURES

(75) Inventors: Masataka Tanaka, Fujisawa (JP); Noriyasu Ninagawa, Yokohama (JP); Yuzo Hiroshige, Tokyo (JP); Noriaki Yamamoto, Zushi (JP)

(73) Assignee: Hitachi, Ltd., Tokyo (JP)

( * ) Notice: Subject to any disclaimer, the term of this patent is extended or adjusted under 35 U.S.C. 154(b) by 650 days.

(21) Appl. No.: 12/246,823

(22) Filed: Oct. 7, 2008

(65) Prior Publication Data

US 2009/0112665 A1     Apr. 30, 2009

(30) Foreign Application Priority Data

Oct. 26, 2007   (JP) .................................. 2007-278529

(51) Int. Cl.
     *G06Q 10/00* (2006.01)
(52) U.S. Cl. ................. 705/7.11; 705/7.12; 705/7.13; 705/7.23; 705/7.25; 705/7.26; 705/28; 705/330; 235/376
(58) Field of Classification Search ............ 705/7
     See application file for complete search history.

(56) References Cited

U.S. PATENT DOCUMENTS 3,687,804 A * 8/1972 Mills ............................. 376/402

FOREIGN PATENT DOCUMENTS

| JP | 6-149849 | | 5/1994 |
| JP | 04295895 | * | 5/1994 |
| JP | 2004-227301 | | 8/2004 |

* cited by examiner

*Primary Examiner* — James A Reagan
(74) *Attorney, Agent, or Firm* — Mattingly & Malur, PC

(57) ABSTRACT

The present invention calculates a predicted accumulative import amount for each chemical substance for each month by using information on a predicted monthly shipping amount and the amount of a chemical substance contained in the product and specifies the chemical substance whose predicted accumulative import amount exceeds a regulation threshold and the time when the import amount exceeds the regulation threshold. The present invention specifies the product containing the chemical substance, calculates the predicted shipping amount of the product from the threshold excess time of the chemical substance to the end of the year, and calculates the loss amount caused by the loss of sales opportunities from the profit per unit sales amount for each product when any regulation measures are not executed on the chemical substance. The present invention finally calculates the ratio of the expense necessary for the measures and the summed value, and displays the ratio.

10 Claims, 15 Drawing Sheets

SHIPPING AMOUNT PREDICTION INFORMATION

| PRODUCT ID | PRODUCT NAME | SHIPPING YEAR/MONTH | SHIPPING AMOUNT | UNIT |
|---|---|---|---|---|
| 100 | A-01 | 06/01 | 100,000 | PIECE |
| 100 | A-01 | 06/02 | 150,000 | PIECE |
| 100 | A-01 | 06/12 | 80,000 | PIECE |
| 200 | B-01 | 06/01 | 20,000 | UNIT |
| 200 | B-01 | 06/03 | 40,000 | UNIT |
| 200 | B-01 | 06/04 | 40,000 | UNIT |
| ⋮ | | | | |

IN-PRODUCT CHEMICAL SUBSTANCE INFORMATION

| PRODUCT ID | PRODUCT NAME | CHEMICAL SUBSTANCE ID | CHEMICAL SUBSTANCE AMOUNT | UNIT | PRODUCT AMOUNT | PRODUCT UNIT |
|---|---|---|---|---|---|---|
| 100 | A-01 | CAS01 | 16 | g | 1 | PIECE |
| 100 | A-01 | CAS02 | 8 | g | 1 | PIECE |
| 200 | B-01 | CAS01 | 80 | g | 1 | UNIT |
| 300 | C-01 | CAS03 | 10 | g | 1 | kg |
| ⋮ | | | | | | |

FIG.4

REGULATION INFORMATION                                113

| REGULATION ID | REGULATION NAME | REGULATION CONTENTS | THRESHOLD |
|---|---|---|---|
| E-RE01 | REACH | REGISTRATION | ≧1t |
| E-RE02 | REACH | REGISTRATION | ≧10t |
| ... | ... | ... | ... |
| E-Ro01 | RoHS | CONTAINING PROHIBITED (EXCEPT Cd) | ≧1,000ppm |
| ⋮ | | | |

FIG.5

PRODUCT SALES PROFIT INFORMATION                    114

| PRODUCT ID | PRODUCT NAME | PROFIT PER UNIT SALES AMOUNT | UNIT AMOUNT | UNIT |
|---|---|---|---|---|
| 100 | A-01 | 100 | 1 | PIECE |
| 200 | B-01 | 200 | 1 | UNIT |
| ⋮ | | | | |

FIG.6

REGULATION MEASURE
EXPENSE INFORMATION    115

| REGULATION ID | MEASURE EXPENSE |
|---|---|
| E-RE01 | 10,000,000 |
| E-RE02 | 30,000,000 |
| ⋮ | |

FIG.7

OUTPUT INFORMATION ACCORDING TO PRODUCT    116

| PRODUCT ID | PRODUCT NAME | CHEMICAL SUBSTANCE ID | REGULATION THRESHOLD | MEASURE TIME LIMIT | EXCESS PERIOD PREDICTION SHIPPING AMOUNT | UNIT | PREDICTED LOSS AMOUNT |
|---|---|---|---|---|---|---|---|
| 100 | A-01 | CAS01 | ≧1t | 06/01 | 330,000 | PIECE | 33,000,000 |
| 200 | B-01 | CAS01 | ≧1t | 06/01 | 100,000 | UNIT | 20,000,000 |
| 100 | A-01 | CAS02 | ≧1t | 06/02 | 230,000 | PIECE | 23,000,000 |
| 100 | A-01 | CAS01 | ≧10t | 06/04 | 80,000 | PIECE | 8,000,000 |
| 200 | B-01 | CAS01 | ≧10t | 06/04 | 40,000 | UNIT | 8,000,000 |
| ... | ... | ... | ... | ... | ... | ... | ... |

FIG.8

OUTPUT INFORMATION ACCORDING TO CHEMICAL SUBSTANCE     117

| CHEMICAL SUBSTANCE ID | REGULATION THRESHOLD | MEASURE TIME LIMIT | MEASURE EXPENSE $\alpha$ | PREDICTED LOSS AMOUNT $\beta$ | RATIO $\alpha/\beta$ |
|---|---|---|---|---|---|
| CAS01 | $\geqq$ 1t | 06/01 | 10,000,000 | 53,000,000 | 0.19 |
| CAS02 | $\geqq$ 1t | 06/02 | 10,000,000 | 23,000,000 | 0.43 |
| CAS01 | $\geqq$ 10t | 06/04 | 30,000,000 | 16,000,000 | 1.88 |
| ... | ... | ... | ... | ... | ... |

FIG.13

PREDICTED SHIPPING AMOUNT FOR EACH SHIPPING YEAR/MONTH, EACH CHEMICAL SUBSTANCE

| SHIPPING YEAR/MONTH | CHEMICAL SUBSTANCE ID | CHEMICAL SUBSTANCE PREDICTED SHIPPING AMOUNT | UNIT |
|---|---|---|---|
| 06/01 | CAS01 | 3,200 | kg |
| 06/01 | CAS02 | 800 | kg |
| 06/02 | CAS01 | 1,600 | kg |
| 06/02 | CAS02 | 400 | kg |
| 06/03 | CAS01 | 3,200 | kg |
| 06/04 | CAS01 | 3,200 | kg |
| ⋮ | | | |

FIG.14

PREDICTED ACCUMULATIVE SHIPPING AMOUNT (PREDICTED ACCUMULATIVE IMPORT AMOUNT) FOR EACH CHEMICAL SUBSTANCE UNTIL EACH MONTH

| IMPORT YEAR/MONTH | CHEMICAL SUBSTANCE ID | CHEMICAL SUBSTANCE PREDICTED ACCUMULATIVE INPORT AMOUNT | UNIT |
|---|---|---|---|
| 06/01 | CAS01 | 3,200 | kg |
| 06/01 | CAS02 | 800 | kg |
| 06/02 | CAS01 | 4,800 | kg |
| 06/02 | CAS02 | 1,200 | kg |
| 06/03 | CAS01 | 8,000 | kg |
| 06/04 | CAS01 | 11,200 | kg |
| ⋮ | | | |
| 06/12 | CAS02 | 8,800 | kg |

FIG.15

EXCESS CHEMICAL SUBSTANCE INFORMATION

| IMPORT YEAR/MONTH | CHEMICAL SUBSTANCE ID | REGULATION ID |
|---|---|---|
| 06/01 | CAS01 | E-RE01 |
| 06/02 | CAS02 | E-RE01 |
| 06/04 | CAS01 | E-RE02 |
| ⋮ | | |

FIG.16

PREDICTED ACCUMULATIVE SHIPPING AMOUNT
OF PRODUCT DURING EXCESS TIME

| PRODUCT ID | PRODUCT NAME | CHEMICAL SUBSTANCE ID | REGULATION ID | IMPORT YEAR/ MONTH | ACCUMULATIVE SHIPPING AMOUNT | UNIT |
|---|---|---|---|---|---|---|
| 100 | A-01 | CAS01 | E-RE01 | 06/01 | 330,000 | PIECE |
| 200 | B-01 | CAS01 | E-RE01 | 06/01 | 100,000 | UNIT |
| 100 | A-01 | CAS02 | E-RE01 | 06/02 | 230,000 | PIECE |
| 100 | A-01 | CAS01 | E-RE02 | 06/04 | 80,000 | PIECE |
| 200 | B-01 | CAS01 | E-RE02 | 06/04 | 40,000 | UNIT |
| ⋮ | | | | | | |
| 300 | C-01 | CAS03 | E-RE02 | 06/12 | 26,000 | UNIT |

FIG.17

PREDICTED LOSS AMOUNT CONCERNING
EXCESS CHEMICAL SUBSTANCE

| CHEMICAL SUBSTANCE ID | THRESHOLD FOR EACH REGULATION | MEASURE TIME LIMIT | LOSS AMOUNT CAUSED BY LOSS OF SALES OPPORTUNITIES |
|---|---|---|---|
| CAS01 | $\geq 1t$ | 06/01 | 53,000,000 |
| CAS02 | $\geq 1t$ | 06/02 | 23,000,000 |
| CAS01 | $\geq 10t$ | 06/04 | 16,000,000 |
| ⋮ | | | | form decision support program and device of regulation measures

EXECUTION DECISION SUPPORT PROGRAM AND DEVICE OF REGULATION MEASURES

CLAIM OF PRIORITY

The present application claims priority from Japanese patent application serial no. 2007-278529, filed on Oct. 26, 2007, the content of which is hereby incorporated by reference into this application.

BACKGROUND OF THE INVENTION

1. Field of the Invention

The present invention relates to an execution decision support program and device of the regulation measures to support the decision on whether to execute measures due to the regulation that limits the amount of substances that enter and exit a business entity.

2. Description of the Related Art

Conventionally, there has been described in JP-A-Hei6 (1994)-149849 and JP-A-2004-227301 a method of managing the amount of substances that enter and exit an enterprise.

The method described in JP-A-Hei6 (1994)-149849 is a method of predicting the shipping amount of each product produced by an enterprise with a constant level of accuracy and low imbalance and managing the purchase or stocks as well as the shipping amount on the basis of the predicted result.

In JP-A-2004-227301, a method is described predicting the shipping amount for the next periods by calculating the ratio of a total shipping amount and a value obtained by subtracting an accumulated shipping amount for a product actually shipped from the total shipping amount during a contract period of the product for every unit period (for example, every month), and obtaining the pattern of the shipping amount for each and every unit period.

In recent years, environmental regulations have been reinforced in each country. As an example, each enterprise in Europe might have an obligation to register information on chemical substances contained in a product to the regulatory agency according to the restriction evaluation authorization and restriction of chemicals (REACH) rules that have been approved in Europe when the total annual import volume of chemical substances contained in a product exceeds a predetermined amount. Moreover, additional information is required whenever the total import volume exceeds a threshold, such as 1 t, 10 t, 100 t, and 1000 t, which incurs expensive measures to collect and prepare the additional information. Therefore, each enterprise in Europe needs to take into consideration of the above-mentioned environmental regulations or make a determination on whether or not to withdraw the business according to the total import volume or earning rate of the product.

The enterprise in Europe should register the chemical substances before the total annual import volume of the in-product chemical substances exceed the above-mentioned threshold to avoid violating environmental regulations, and therefore, the above-mentioned determination should be made before the total import volume has been decided. In general, earnings increase in proportion to the sales volume of product. When the product or procured goods such as parts, substances, etc. to be used for the product are imported, however, the total import volume of the in-product chemical substances also increases correspondingly, and therefore, a possibility of exceeding the above-mentioned threshold increases. For this case, it becomes impossible to sell the product that contains the chemical substances until the chemical substances are registered, which could result in the loss of sales opportunities for the product. Therefore, the trade-off between measuring the expenses against the regulations and the loss of sales opportunities is considered. As a result, determining the above-mentioned import volume is difficult to make.

The methods described in JP-A-Hei6 (1994)-149849 and JP-A-2004-227301 only describe predicting the shipping amount of a product produced by an enterprise, but nothing is described regarding measures due to regulations that limit the amount of substances that enter and exit the enterprise.

SUMMARY OF THE INVENTION

Accordingly, the present invention provides executing a decision support program and a device for regulating measures that may facilitate a decision on whether to execute measures against regulations that limit the amount of substances that enter and exit a business entity.

To achieve the above, the present invention suggests a trade-off between expenses necessary for the measures against the regulations and the amount of loss of sales opportunities caused by not executing any measures as a method of supporting the decision on the measures against the regulations that limit the amount of substances that enter and exit the enterprise.

According to an exemplary embodiment of the present invention, there is provided a decision support program of regulation measures, which supports a decision on whether to execute measures against a regulation that limits the amount of a substance that enters and exits a business entity during a predetermined period, the execution decision support program enabling a computer to execute a process including: an acquisition step of acquiring a regulation threshold of the amount of each of one or more regulated substances in the regulation, a predicted shipping amount for each of one or more products of the business entity during each time throughout the predetermined period, the content of a regulated substance contained in each of the one or more products, a profit per unit amount for each of the one or more products; and measuring expense necessary for the measures from input means of a computer or a storage unit of the computer; an accumulative substance amount calculation step of using the predicted shipping amount for each of the one or more products throughout the predetermined period and the content of the regulated substance contained in each of the one or more products to evaluate a predicted accumulative receiving substance amount for each regulated substance until each time throughout the predetermined period when the receiving of the regulated substance is regulated against the business entity, and a predicted accumulative shipping amount for each regulated substance until each time throughout the predetermined period when the shipping of the regulated substance is regulated against the business entity; a substance/time specifying step for specifying a regulated substance exceeding the regulation threshold among one or more regulated substances and a predetermined time exceeding the predicted accumulative receiving substance amount for each regulated substance until each time throughout the predetermined period or the predicted accumulative shipping substance amount for each regulated substance until each time throughout the predetermined period that is evaluated in the accumulative substance amount calculation step; a product specifying step for specifying a product containing the regulated substance specified in the substance/time specifying step among the one or more products; an excess period shipping amount calculation step for using the predicted shipping amount for each of the one or more products throughout the predetermined period to evaluate the predicted accumulative shipping amount from the predetermined time specified in the substance/time specifying step to the end of the predetermined period with respect to one or more specific products specified in the product specifying step; a loss amount calculation step of evaluating a loss amount for each of the one or more specific products when it is assumed that any measures against the regulation are not executed and the specific product is not shipped since the specific period from the predicted accumulative shipping amount of the specific product from the specific time to the end of the year and the profit per unit amount for each of the one or more products, and evaluating the loss amount for each regulated substance by totaling the loss amounts of one or more specific products containing an identical regulated substance among the one or more specific products; an output step of outputting the loss amount of the regulated substance evaluated in the loss amount calculation step, the measure expense, and/or the ratio of the loss amount and the measure expense for the each regulated substance to output means of the computer; and a measure effect calculation step of evaluating the ratio when the ratio is outputted in the outputting step.

According to another exemplary embodiment of the present invention, there is provided a decision support device for regulating measures, which supports a decision on whether to execute measures against a regulation that limits the amount of a substance which enters and exits a business entity during a predetermined period, including: acquisition means of acquiring a regulation threshold of the amount of each of one or more regulated substances in the regulation, a predicted shipping amount for each of one or more products of the business entity throughout the predetermined period, the content of a regulated substance contained in each of the one or more products, a profit per unit amount for each of the one or more products, and a measure expense necessary for the measures; accumulative substance amount calculation means of using the predicted shipping amount for each of the one or more products throughout the predetermined period and the content of the regulated substance contained in each of the one or more products to evaluate a predicted accumulative receiving substance amount for each regulated substance until each time throughout the predetermined period when the regulated substance received is regulated against the business entity, and a predicted accumulative shipping amount for each regulated substance until each time throughout the predetermined period when the shipping of the regulated substance is regulated against the business entity; substance/time specifying means of specifying a regulated substance in excess of the regulation threshold among one or more regulated substances and a predetermined time exceeding the regulation threshold from the predicted accumulative receiving substance amount for each regulated substance until each time throughout the predetermined period or the predicted accumulative shipping substance amount for each regulated substance until each time throughout the predetermined period that is evaluated by the accumulative substance amount calculation means; product specifying means of specifying a product containing the regulated substance specified by the substance/time specifying means among the one or more products; an excess period shipping amount calculation means of using the predicted shipping amount for each of the one or more products during each time throughout the predetermined period to evaluate the predicted accumulative shipping amount from the specific time specified by the substance/time specifying means to the end of the predetermined period with respect to one or more specific products specified by the product specifying means; loss amount calculation means of evaluating a loss amount for each of the one or more specific products when it is assumed that any measures against the regulation are not executed and the specific product is not shipped since the specific period from the predicted accumulative shipping amount of the specific product from the specific time to the end of the year and the profit per unit amount for each of the one or more products, and evaluating the loss amount for each regulated substance by totaling the loss amounts of one or more specific products containing an identical regulated substance among the one or more specific products; output means of outputting the loss amount of the regulated substance evaluated by the loss amount calculation means, the measure expense, and/or the ratio of the loss amount and the measure expense for the each regulated substance; and measure effect calculation means of evaluating the ratio when the ratio is outputted by the outputting means.

According to the present invention, the amount of loss caused by not executing any regulation measures and expenses necessary for the regulation measures, and/or the ratio of the loss amount and measure expenses are output, and therefore, the present invention may facilitate a decision on whether to execute the regulation measures from the viewpoint of the cost.

BRIEF DESCRIPTION OF THE DRAWINGS

FIG. 2 is an explanatory view illustrating a data organization of shipping amount prediction information;

FIG. 3 is an explanatory view illustrating a data organization of in-product chemical substance information;

FIG. 4 is an explanatory view illustrating a data organization of regulation information;

FIG. 5 is an explanatory view illustrating a data organization of product sales profit information;

FIG. 6 is an explanatory view illustrating a data organization of regulation measure expense information;

FIG. 7 is an explanatory view illustrating a data organization of output information according to product;

FIG. 8 is an explanatory view illustrating a data organization of output information according to the amount of chemical substance according to an exemplary embodiment of the present invention;

FIG. 13 is an explanatory view illustrating a data organization of predicted shipping amount information for each year/month and each chemical substance;

FIG. 14 is an explanatory view illustrating a data organization of monthly predicted accumulative shipping amount information for each chemical substance;

FIG. 15 is an explanatory view illustrating a data organization of excess chemical substance information;

FIG. 16 is an explanatory view illustrating a data organization of predicted accumulative shipping amount information of a product during the excess period;

FIG. 17 is an explanatory view illustrating a data organization of predicted loss amount information concerning an excess chemical substance;

DETAILED DESCRIPTION OF THE PREFERRED EMBODIMENTS

Hereinafter, an execution decision support device due to regulation measures according to an exemplary embodiment of the present invention will be described with reference to the accompanying drawings.

Figure 1:
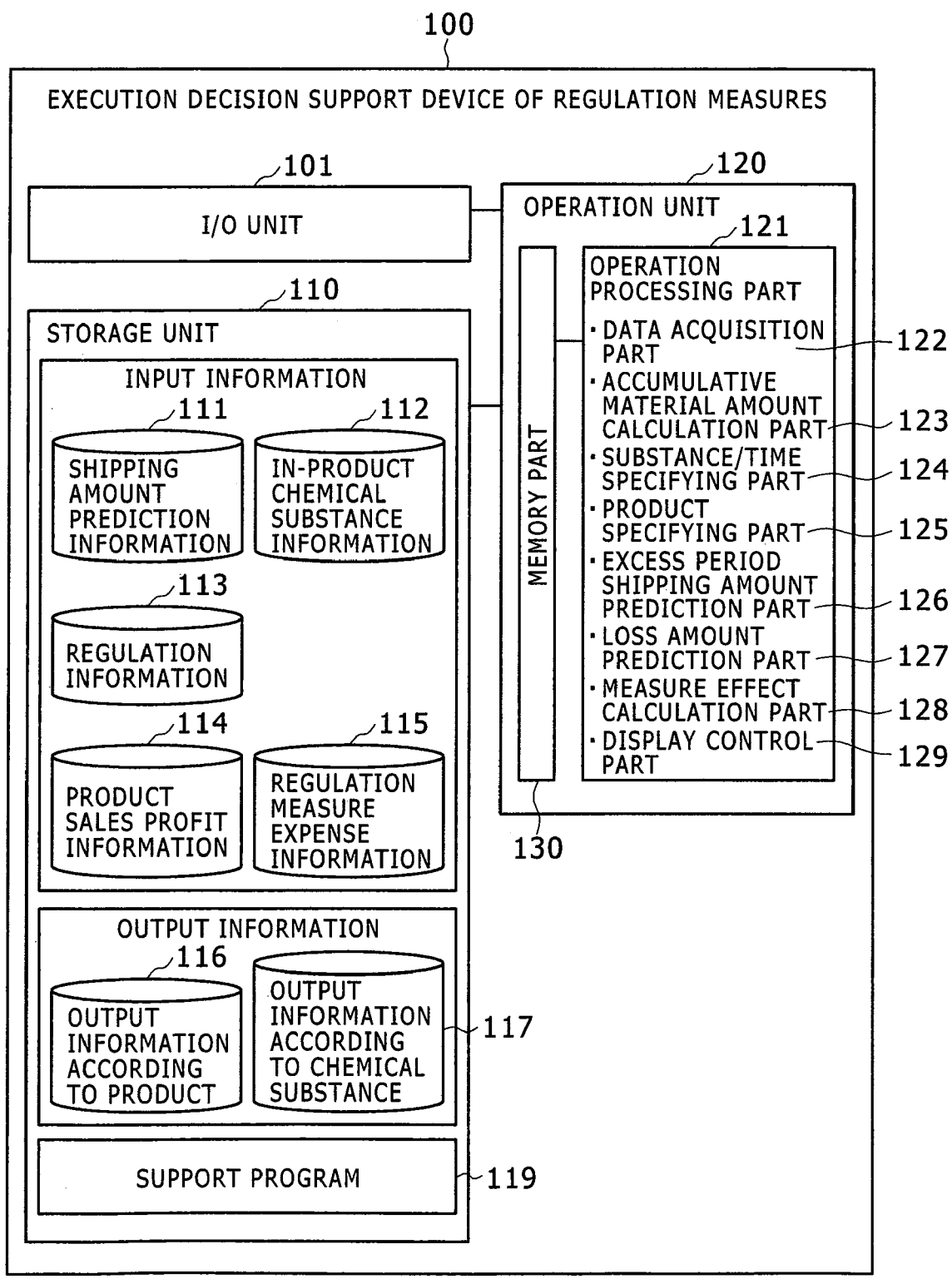
FIG. 1 is an explanatory view illustrating a configuration of an execution decision support device of regulation measures.

An execution decision support device due to regulation measures of this embodiment is configured as a computer as shown in FIG. 1, which supports the execution decision in respects to the European regulation measures for enterprises in Europe.

This support device 100 includes an I/O unit 101, a storage unit 110, and an operation unit 120.

The I/O unit 101 acquires data necessary for processing of the operation unit 120 or displays the operation results of the operation unit 120, and this I/O unit 101 may include, for example, an input device such as a key board, a mouse, or the like, a communication device for communication with external devices, a record reproduction device of a disc-type storage medium, and an output device such as a cathode ray tube (CRT), a liquid crystal monitor, or the like.

The storage unit 110 is composed of a storage device such as a hard disk drive, a memory, or the like. The storage unit 110 stores input information that is inputted to the operation unit 120 and outputs information, which is a result outputted from the operation unit 120. In addition, the storage unit 110 previously stores a support program 119 that is executed by the operation unit 120.

The input information stored in the storage unit 110 includes shipping amount prediction information 111 including information on the predicted monthly shipping amount for each product of the enterprise throughout the year; in-product chemical substance information 112 including information on the content of a specific chemical substance contained in each product of the enterprise; regulation information 113 representing the contents in respects to the above-mentioned European regulations; product sales profit information 114 including information on the profit per unit amount for each product of the enterprise; and regulation measure expense information 115 including information on expenses necessary for measures due to each regulation. This input information is received through the I/O unit 101 before the operation unit 120 executes the support program 119, and stored in the storage unit 110. However, it is not necessary to store the input information in the storage unit 110 before the execution of the support program 119, and the required input information may be received through the I/O unit 101 whenever the input information is required according to the execution of the support program 119. In addition, the shipping amount prediction information 111 including the information on the predicted monthly shipping amount for each product may employ the method described in JP-A-Hei6 (1994)-149849 and JP-A-2004-227301, mentioned in the Background, or the one predicted by a person in the enterprise from the sales environment for each product.

The output information stored in the storage unit 110 includes output information 116 according to product, including information on the loss amount caused by the loss of sales opportunities for each of the products that are subject to regulation among the products of the enterprise and output information 117 according to chemical substance, including information on the loss amount caused by the loss of sales opportunities of each product containing the chemical substance that is subject to regulation.

The operation unit 120 includes an operation processing part 121 that actually performs operation processing and a memory part 130 that serves as a work area for the operation processing by the operation processing part 121. The operation processing part 121 includes: a data acquisition part 122 that acquires data from the I/O unit 101 or the storage unit 110; an accumulative substance amount calculation part 123 that calculates the predicted accumulative shipping amount of the chemical substance for every month throughout the year (=predicted accumulative receiving amount=predicted accumulative import amount); a substance/time specifying part 124 that specifies the chemical substance whose predicted accumulative import amount exceeds a regulation threshold and simultaneously, the time when the predicted accumulative import amount of the chemical substance exceeds the regulation threshold; a product specifying part 125 that specifies a product containing the chemical substance; an excess period shipping amount prediction part 126 that evaluates the total shipping amount from the time specified regarding the specified product to the end of the year; a loss amount prediction part 127 that evaluates the loss amount caused by the loss of sales opportunities from the shipping amount of the specified product evaluated that exceeds the period shipping amount prediction part 126; a measure effect calculation part 128 that evaluates an effect obtained by executing the regulation measures; and a display control part 129 that controls the contents displayed on the display device of the I/O unit 101. Each of the above functional parts 122 to 129 in the operation unit 120 operates when the operation unit 120 executes the support program 119 stored in the storage unit 110.

The shipping amount prediction information 111 that is inputted information stored in the storage unit 110 is represented herein in a table shown in FIG. 2. In this table, there are a product ID region which stores a product ID, a product name region which stores a product name, a shipping year/month region which stores the shipping year/month of product, a shipping amount region which stores the predicted shipping amount of product in the shipping year/month, and a unit region which stores the unit of the shipping amount of product. In addition, it has been assumed herein that the shipping year/month of the product is identical to the import year/month of the product itself or parts/substances used for the product. If the two periods are different from each other, it is necessary to replace the shipping year/month by the import year/month, for example, by subtracting the lead time of the product from the shipping year/month of the product. Further, even though it has been assumed herein that the product itself and the parts/substances used for the product are all imported, for example, the product may be produced domestically or the parts/substances used for the product may be procured domestically.

The in-product chemical substance information 112 that is inputted information is also represented in a table shown in FIG. 3. In this table, there are a product ID region which stores a product ID, a product name region which stores a product name, a chemical substance ID region which stores the ID of chemical substance contained in the product, a chemical substance amount region which stores the content of the chemical substance, a unit region which stores the unit of the content, a product amount region which stores the amount of products that become a standard of the content, and a product unit region which stores the unit of the amount of the products. The example represented in FIG. 3 shows that the product of product ID "100" and product name "A-01" contains the chemical substance of chemical ID "CAS01" and the chemical substance of chemical ID "CAS02" by 16 g and 8 g per unit, respectively.

The regulation information 113 that is input information is represented as a table as shown in FIG. 4. In this table, there are a regulation ID region which stores the ID of regulation, a regulation name region which stores the name of the regulation, a regulation contents region which stores the execution content of the regulation, and a threshold region which stores the threshold amount of the chemical substance that is subject to the regulation. The example represented in FIG. 4 shows that the regulation of regulation name "REACH" has two types of thresholds, one of which is "1 t" when the regulation ID is "E-RE01" and the other is "10 t" when the regulation ID is "E-RE02," and registration is required when the amount of chemical substance is more than the threshold. In addition, the term "RoHS" stored in the regulation name region in FIG. 4 is the abbreviation for "Restriction of the use of Hazardous Substances."

The product sales profit information 114 that is input information is represented as a table as shown in FIG. 5. In this table, there are a product ID region which stores a product ID, a product name region which stores a product name, a profit region which stores the profit per unit sales amount of the product, a unit amount region which stores the amount of product corresponding to unit sales amount, and a unit region which stores the unit of the product amount. The example represented in FIG. 5 shows that the profit of 100 may be obtained from the selling of one piece of the product having the product ID "100" and product name "A-01".

The regulation measure expense information 115 that is inputted information is also represented in a table shown in FIG. 6. In this table, there are a regulation ID region which stores a regulation ID and a measure expense region, which stores the measure expense corresponding to the regulation ID. The example represented in FIG. 6 shows that "10,000,000" is the requirement in order to determine the expense for the measure due to the regulation whose ID is "E-RE01".

The output information 116 according to product is also represented in a table shown in FIG. 7. In this table, there are a product ID region which stores a product ID, a product name region which stores a product name, a chemical substance ID region which stores the ID of a chemical substance contained in the product, a threshold region which stores a regulation threshold, a measure time limit region which stores a period taken for the chemical substance to reach the amount of substance more than the regulation threshold, i.e. a period of the regulation measures, an excess period prediction shipping amount region which stores the excess period prediction shipping amount that is the loss shipping amount caused by the loss of sales opportunities by not executing any regulation measures, a unit region which stores the unit of the shipping amount, and a predicted loss amount region which stores the predicted loss amount caused by the loss of sales opportunities by not executing any regulation measures. The example represented in FIG. 6 shows that measures need to be executed on the product of product ID "100" and product name "A-01" by January, 2006, according to the regulation threshold that is more than 1t, and the loss of sales opportunities of 330,000 is predicted if the business is withdrawn without executing any measures, and this causes the loss amount to reach 33,000,000.

The output information 117 according to chemical substance is represented as a table as shown in FIG. 8. In this table, there are a chemical substance ID region which stores a chemical substance ID, a regulation threshold region which stores a regulation threshold, a measure time limit region which stores a time limit for regulation measures, a measure expense region which stores a measure expense a for regulation, a predicted loss amount region which stores a predicted loss amount β caused by the loss of sales opportunities by not executing any regulation measures, and a ratio region which stores a ratio (α/β) of the measure expense α and the predicted loss amount β. The example represented in FIG. 8 shows that measures need to be executed on the chemical substance of chemical substance ID "CAS01" by June $1^{st}$ according to the regulation threshold of more than 1 t, 10000000 is required as the measure expense α, 53000000 is incurred as the predicted loss amount β, and therefore, the ratio (α/β) is 0.19.

Figure 10:
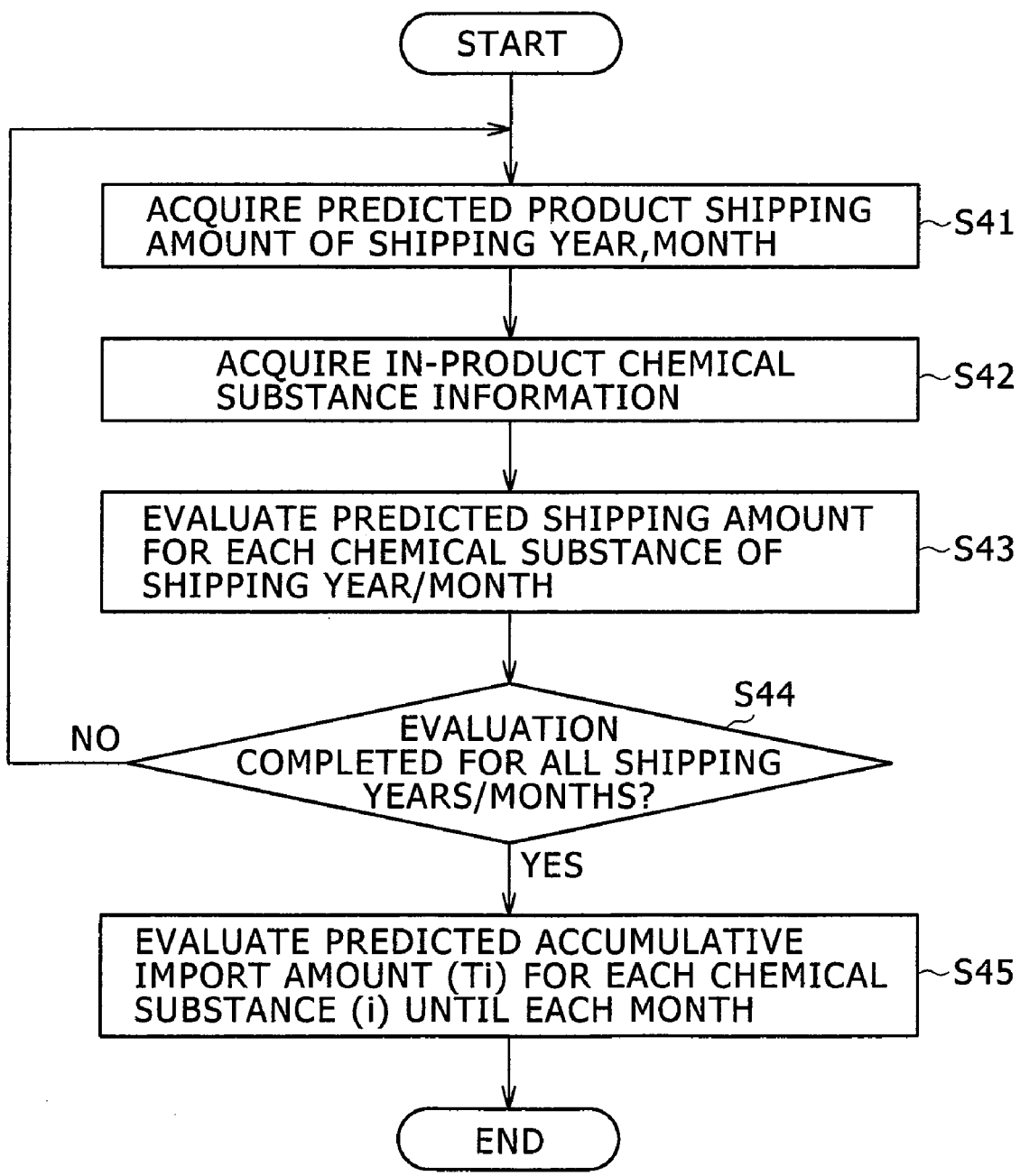
FIG. 10 is a flowchart illustrating the detailed procedure of step S4 in the flowchart shown in FIG. 9.
Figure 11:
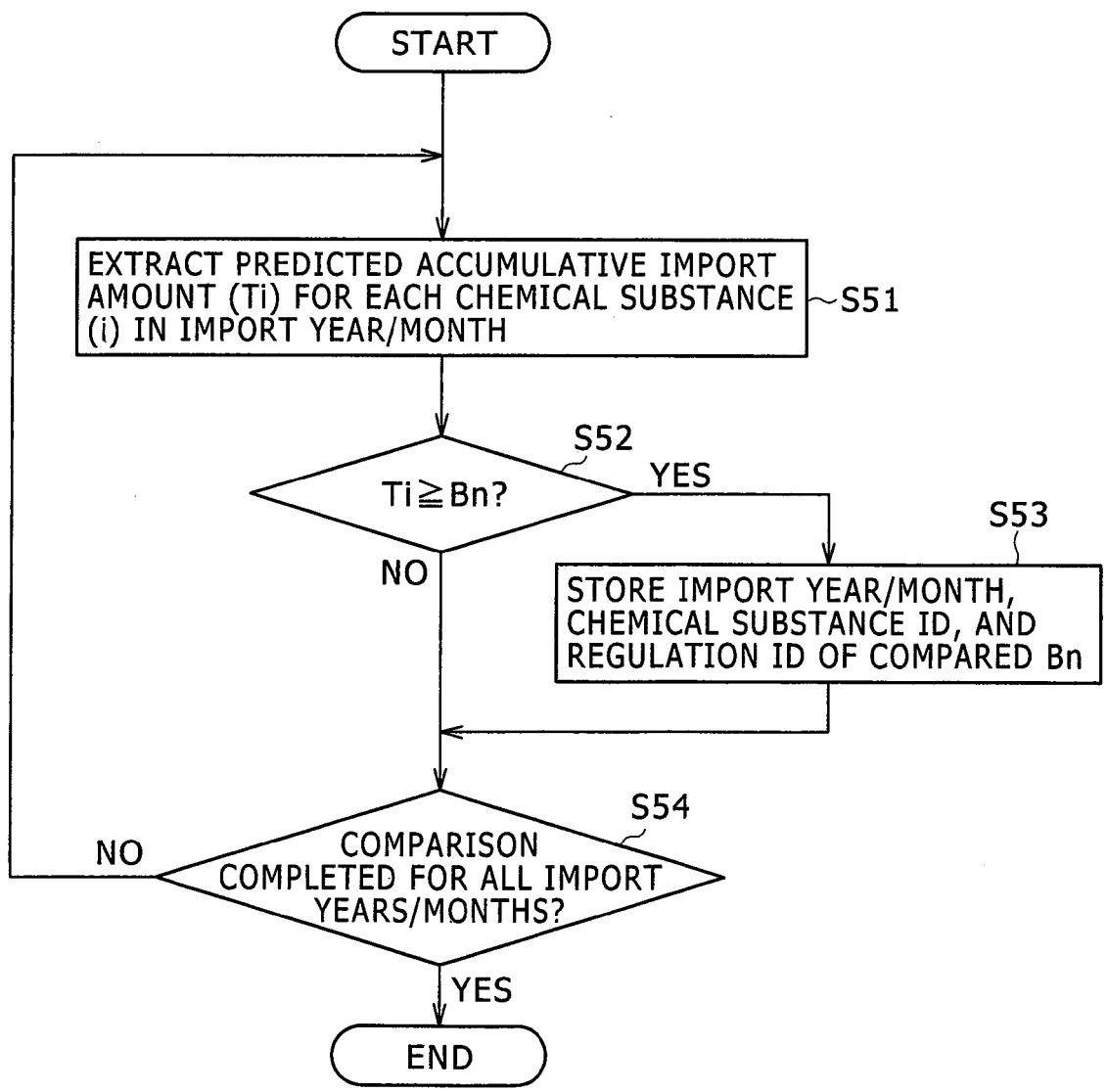
FIG. 11 is a flowchart illustrating the detailed procedure in step S5 in the flowchart shown in FIG. 9.

Next, an operation of the support device 100 of this exemplary embodiment will be described according to the flowchart shown in FIG. 9 to FIG. 11.

Figure 12:
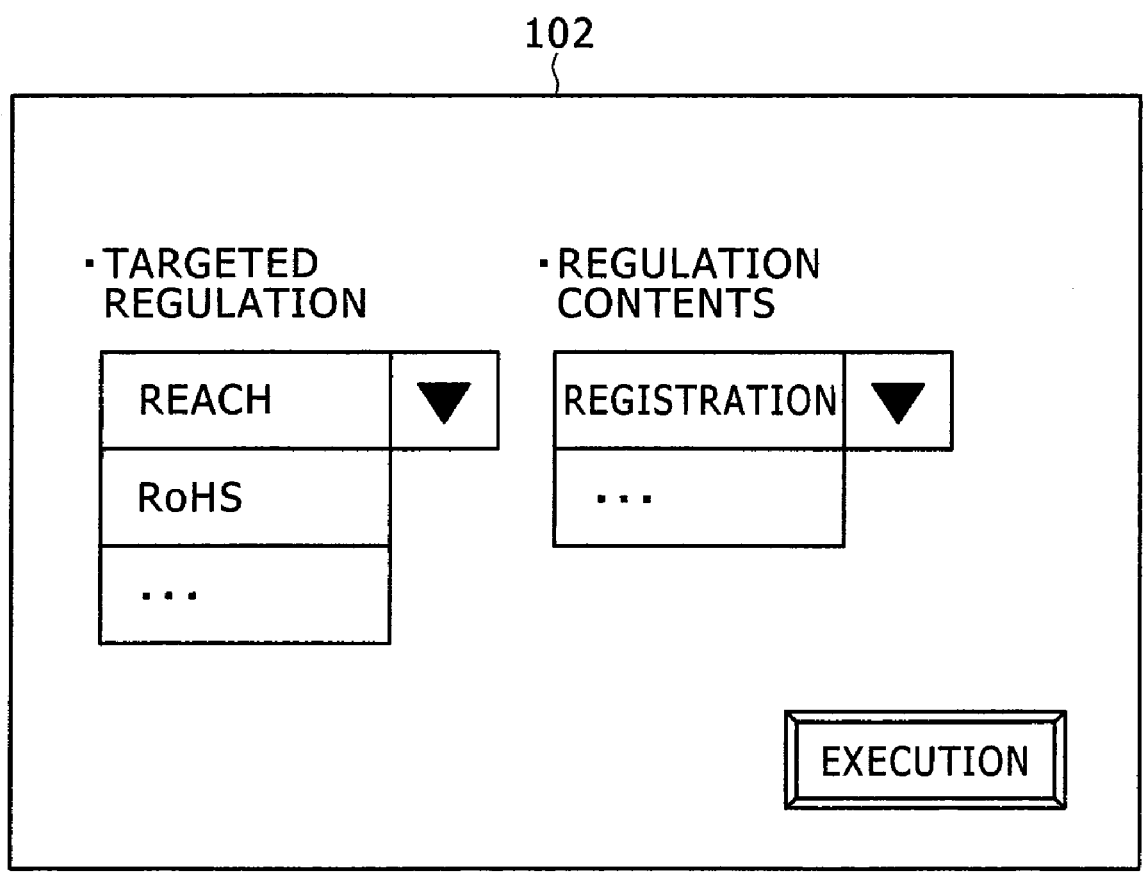
FIG. 12 is an explanatory view illustrating an example of an input screen of a targeted regulation and its contents.

First of all, the support device 100 receives a targeted regulation and its contents by using the I/O unit 101 (step S1). More specifically, the display device 102 of the I/O unit 101 displays, for example, a screen shown in FIG. 12 so that the user may select a targeted regulation and its contents in a pull-down menu manner. The data acquisition part 122 of the operation unit 120 obtains the targeted regulation and its contents that are received through the I/O unit 101, and then stores them to the memory part 130 temporarily. It is represented in the example of FIG. 12 that the user selects "REACH" and "registration" as the targeted regulation and its contents, respectively, and executes them. Hereinafter, it will be described that the targeted regulation is "REACH" and the contents of the regulation is "registration".

Next, the data acquisition part 122 acquires the threshold of the regulation corresponding to the targeted regulation and its contents that are stored in the memory unit 130 from the regulation information 113 (see FIG. 4) stored in the storage unit 110 (step S2). Here, the data acquisition part 122 reads the overall thresholds of the regulation whose targeted regulation is "REACH" and its contents are "registration". In addition, the data acquisition part 122 reads the shipping amount prediction information 111 (see FIG. 2) and the in-product chemical substance information 112 (see FIG. 3) that are stored in the storage unit 110 (step S3).

Next, the accumulative substance amount calculation part 123 calculates the predicted accumulative shipping amount (=predicted accumulative import amount) until each month for each chemical substance, and stores it in memory part 130 (step S4).

Here, detailed procedures of step S4 will be described according to the flowchart shown in FIG. 10.

To begin with, the accumulative substance amount calculation part 123 extracts the predicted shipping amount of all the products corresponding to the first month of the year among the monthly shipping amount for each product that has been acquired in step S3 (step S41). For example, the accumulative substance amount calculation part 123 extracts the predicted shipping amount of "100000" for the shipping year/month "06/01" corresponding to the product ID "100" and the predicted shipping amount of "20000" for the shipping year/ month "06/01" corresponding to the product ID "200" from the shipping amount prediction information 111 shown in FIG. 2.

Subsequently, the accumulative substance amount calculation part 123 extracts information on all of the products scheduled to be shipped from the in-product chemical substance information 112 acquired in step S3 (step S42). For example, the accumulative substance amount calculation part 123 extracts the information on the products whose IDs are "100" and "200" from the in-product chemical substance information 112 shown in FIG. 3.

The accumulative substance amount calculation part 123 calculates the predicted shipping amount for each chemical substance from the predicted shipping amount of all the products scheduled to be shipped in the shipping year/month and the amount of chemical substances contained in each product (step S43). In this case, the accumulative substance amount calculation part 123 may calculate the predicted shipping amount for each chemical substance by evaluating the total amount of each chemical substance after evaluating the amount of chemical substances contained in each of the products scheduled to be shipped.

Next, the accumulative substance amount calculation part 123 determines whether or not the above steps S41 to S43 have been completed with respect to the overall shipping years/months. Here, the routine returns to step S41 unless steps S41 to S43 are determined to have been completed, and the routine proceeds to step S45 if steps S41 to S43 are determined to have been completed. Here, the predicted shipping amount for each chemical substance is evaluated with respect to each shipping year/month in the overall shipping years/months as shown in FIG. 13, if steps S41 to S43 are ended.

The accumulative substance amount calculation part 123 calculates the predicted accumulative shipping amount (=predicted accumulative import amount) for each chemical substance until each shipping year/month, and stores the result in the memory part 130 in step S45 (step S45). By doing so, all the procedures of step S4 are ended. In addition, the above-mentioned accumulative shipping amount is identical to the predicted accumulative import amount since it has been assumed that the shipping year/month of the product and the import year/month of the product itself or parts/substances used for the product are equal to each other and the product itself and its parts/substances are all imported.

Here, such data as shown in FIG. 14 is stored in the memory part 130. The example represented in FIG. 14 shows that the predicted accumulative shipping amount (=predicted accumulative import amount) until the shipping year/month (=import year/month) "06/02" corresponds to the value "4,800 kg" obtained by adding the shipping amount "1,600 kg" (refer to FIG. 13) of the shipping year/month "06/02" with the predicted accumulative shipping amount "3,200 kg" (refer to FIG. 14) until the shipping year/month "06/01", for example with respect to the chemical substance of chemical substance ID "CAS01".

Figure 9:
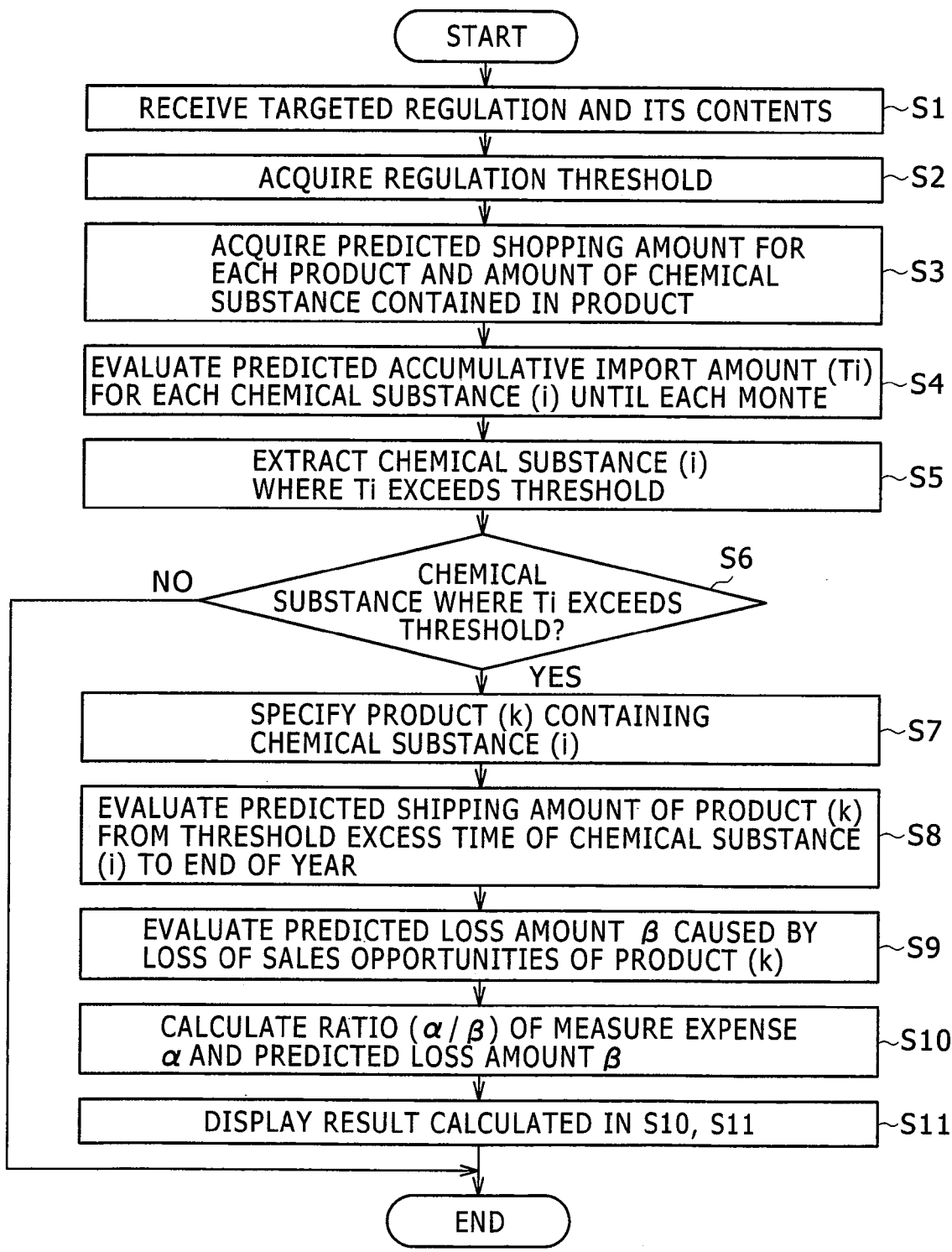
FIG. 9 is a flowchart illustrating an operation of an execution decision support device.

When the above-mentioned step S4 ends, the substance/time specifying part 124 of the operation unit 120 performs an extraction process of the chemical substance exceeding the regulation threshold acquired in step S2 among the predicted accumulative import amount $T_i$ for each chemical substance for each month (step S5) as shown in the flowchart of FIG. 9.

Here, detailed procedures of step S5 will be described according to the flowchart shown in FIG. 12.

First of all, the substance/time specifying part 124 extracts the oldest predicted import amount $T_i$ among the predicted accumulative import amounts for each chemical substance for each month (see FIG. 14), which are stored in the memory part 130 in step S4 (step S51). For example, the substance/time specifying part 124 extracts the predicted accumulative import amounts of the import year/month "06/01" for both chemical substances of chemical substance IDs "CAS01" and "CAS02" in the example represented in FIG. 14. Next, the substance/time specifying part 124 determines whether or not the predicted accumulative import amount $T_i$ for each chemical substance extracted in step S51 is more than the regulation threshold $B_n$ stored in the memory part 130 in step S2 (step S52). At this time, the unit of the predicted accumulative import amount is adapted to be equal to the unit of the regulation threshold when the unit of the regulation threshold does not conform to the unit of the predicted accumulative import amount. Further, when two regulation thresholds ($\geqq 1$ t, $\geqq 10$ t) are provided as shown in FIG. 14, the smaller of the two thresholds is used. For instance, the predicted accumulative import amount (3.2 t) of the chemical substance of chemical substance ID "CAS01" in the import year/month "06/01" is compared with each of the threshold "1 t" of the regulation of regulation ID "E-RE01" and the threshold "10 t" of the regulation of regulation ID "E-RE02". In this case, the chemical substance of chemical substance ID "CAS01" in the import year/month "06/01" is subject to the regulation of regulation ID "E-RE01" but not the regulation of regulation ID "E-RE02" since 10 t>3.2 t$\geqq$1 t.

When the predicted accumulative import amount $T_i$ is determined to be equal to or more than the regulation threshold $B_n$, the substance/time specifying part 124 stores the import year/month when the predicted accumulative import amount $T_i$ is determined to be more than the regulation threshold, the chemical substance ID, and the regulation ID of the regulation threshold in the memory part 130 (step S53) and then allows the routine to proceed to step S54. In step S53, the substance/time specifying part 124, for example, stores the import year/month "06/01", the chemical substance ID "CAS01", and the regulation ID "E-RE01" in the memory part 130 since the predicted accumulative import amount (3.2 t) of the chemical substance of chemical substance ID "CAS01" is more than threshold "1 t" of the regulation of regulation ID "E-RE01" in the import year/month "06/01". The routine proceeds to step S54 immediately when the predicted accumulative import amount $T_i$ is determined to be less than the regulation threshold $B_n$.

In step S54, the substance/time specifying part 124 determines whether or not the above steps S51 to S53 have been performed with respect to the overall import years/months. If not performed, the substance/time specifying part 124 returns the routine to step S51 and then extracts the predicted accumulative import amount $T_i$ for the next old import year/month, and if performed, the substance/time specifying part 124 ends the process of step S5. Further, once it is determined during the repetition of the above steps S1 to S53 that a chemical substance having a certain chemical substance ID is subject to regulation having a certain regulation ID, a comparison between the predicted accumulative import amount of the chemical substance having the chemical substance ID and the threshold of the regulation having the regulation ID is no longer compared. For instance, after the chemical substance of chemical substance ID "CAS01" in the import year/month "06/01" is determined to be subject to the regulation whose ID is "E-RE01", a comparison between the predicted accumulative import amount and the threshold of the regulation of regulation ID "E-RE01" is not conducted on the chemical substance whose ID is "CAS01" in the subsequent years/months.

When the above-mentioned step S4 ends, the substance/time specifying part 124 determines whether there is a chemical substance whose predicted accumulative import amount Ti exceeds the regulation threshold by referring to the excess chemical substance information (see FIG. 15) stored in the memory part 130 in step S53 shown in the flowchart of FIG. 9 (step S6). The substance/time specifying part 124 ends the series of processes if there is no pertinent chemical substance. If there is a pertinent chemical substance, the substance/time specifying part 124 specifies the product containing the chemical substance from the in-product chemical substance information 112 (see FIG. 3) that is stored in the storage unit 110 by using the ID of the chemical substance as a key (step S7). For instance, when it is represented in the chemical substance information shown in FIG. 15 that the chemical substances of chemical substance IDs "CAS01" and "CAS02" exist as the chemical substances whose predicted accumulative import amount Ti exceeds the regulation threshold, the products of product IDs "100" and "200", which contain such chemical substances are specified from the in-product chemical substance information 112 shown in FIG. 3.

Next, the excess period shipping amount prediction part 126 of the operation unit 120 calculates the predicted shipping amount from the threshold excess period to the end of the year with respect to the product specified in step S7, and stores the calculated predicted shipping amount in the memory part 130 (step S8). More specifically, the excess period shipping amount prediction part 126 firstly obtains the import year/month as the threshold excess period of the chemical substance from the excess chemical substance information (see FIG. 15) stored in the memory part 130. Subsequently, the excess period shipping amount prediction part 126 obtains the predicted monthly shipping amount of product from the threshold excess period to the end of the year from the shipping amount prediction information 111 (see FIG. 2) for the product that contains the chemical substance specified in step S7. The excess period shipping amount prediction part 126 evaluates the predicted accumulative shipping amount of product until the end of the year by totaling the predicted monthly shipping amounts of product, and stores the evaluated result in the memory part 130 together with the ID and name of the product, the regulation ID, and the import year/month as shown in FIG. 16. Since the chemical substance of chemical substance ID "CAS01" exceeds the threshold of the regulation of regulation ID "E-RE01" at the stage of the import year/month "06/01" in the example represented in FIG. 14, the excess period shipping amount prediction part 126 evaluates the predicted accumulative shipping amounts of product between the shipping years/months "06/01" and "06/12" from the shipping amount prediction information 111 shown in FIG. 2 with respect to the products of product IDs "100" and "200", which contain the chemical substance, and stores the evaluated predicted accumulative shipping amounts of product in the memory part 130 as shown in FIG. 16.

Next, the loss amount prediction part 127 of the operation unit 120 calculates the predicted loss amount caused by the loss of sales opportunities for each product specified in step S7, evaluates the predicted loss amounts for the overall products that contain the excess chemical substance and stores the evaluated predicted loss amounts in the memory part 130, and then stores the predicted loss amounts and the like in the corresponding regions in the table (see FIG. 7) representing the output information 116 according to product (step S9).

The product specified in step S7 cannot sell since the threshold excess period without executing any regulation measures because the amount of the chemical substance contained in the product exceeds the regulation threshold even if selling is conducted as predicted. In this sense, it is assumed herein that the product sells even after the threshold excess period and the sales profit of product after the threshold excess period is equal to the predicted loss amount caused by the loss of sales opportunities. To calculate the predicted loss amount caused by the loss of sales opportunities, the loss amount prediction part 127 firstly acquires the profit per unit sales amount of the product with reference to the product sales profit information 114 (see FIG. 5) stored in the storage unit 110. And, the loss amount prediction part 127 evaluates the predicted loss amount caused by the loss of sales opportunities regarding the product by adding the acquired profit to the predicted shipping amount from the threshold excess period to the end of the year that has been evaluated in step S8. The excess chemical substance contained in the product might also be contained in other products. In this case, the loss amount prediction part 127 also evaluates the predicted loss amount caused by the loss of sales opportunities for the other products similar to above. And then, the loss amount prediction part 127 adds each loss amount to the others to evaluate the predicted loss amount of all the products that contain the excess chemical substance, and stores the evaluated loss amount in the memory part 130 as the predicted loss amount concerning the excess chemical substance as shown in FIG. 17 and simultaneously stores it in the corresponding regions in the table representing the output information 116 according to product, as shown in FIG. 7.

For instance, when the measures (registration) due to the regulation whose ID is "E-RE01" are not executed on the chemical substance whose ID is "CAS01", the predicted loss amount caused by the loss of sales opportunities is evaluated as below.

Since the predicted accumulative shipping amount of product of product ID "100" that contains the chemical substance of chemical substance ID "CAS01" during the excess period is 330,000 (pieces) and the profit per unit sales amount of the product of product ID "100" is 100, the predicted loss amount of this product becomes equal to the predicted shipping amount "330,000" (pieces)×profit per unit sales amount "100"="33,000,000". Moreover, since the predicted accumulative shipping amount of the product of product ID "200" that contains the chemical substance of chemical substance ID "CAS01" during the excess period is "100,000" (units) and the profit per unit sales amount of the product of product ID "200" is 200, the predicted loss amount of this product becomes equal to the predicted shipping amount 100,000 (units)×profit per unit sales amount 200=20,000,000. And, the loss amount prediction part 127 adds the predicted loss amount of the product of product ID "100" to the predicted loss amount of the product of product ID "200" to obtain the predicted loss amount, i.e., 53,000,000, corresponding to the chemical substance of chemical substance ID "CAS01". The predicted loss amount is stored in the memory part 130 along with the chemical substance ID, the regulation threshold, and the measure time limit (=import year/month of the threshold excess time) as shown in FIG. 17. Further, the loss amount prediction part 127 completes the output information 116 according to the product, as shown in FIG. 7, by referring to the above-mentioned data and the information which has been already stored in the memory part 130 as shown in FIG. 16. In addition, the measure time limit shown in FIG. 7 corresponds to the import year/month shown in FIG. 16.

Next, the measure effect calculation part 128 of the operation unit 120 evaluates a ratio ($=\alpha/\beta$) between the measure expense $\alpha$ of the regulation represented in the regulation measure expense information 115 (see FIG. 6) and the predicted loss amount β caused by the loss of sales opportunities of the product that is subject to the regulation, and stores once the evaluated ratio in the memory part 130 and then stores the above-mentioned ratio and the like in the corresponding regions in the table (see FIG. 8) representing the output information 117 according to chemical substance (step S10).

For example, the ratio (=α/β) between the measure expense α and the predicted loss amount β is about 0.19 (=10,000,000/53,000,000) since the predicted loss amount β of the regulation threshold of "more than 1 t" is "53,000,000" with respect to the chemical substance of the chemical substance ID of "CAS01", as shown in FIG. 17, and the regulation ID of the regulation threshold of "more than 1 t" is "E-RE01," as shown in FIG. 4, and therefore, the measure expense α is 10,000,000 as shown in FIG. 6. The above ratios are also calculated in the similar manner with respect to information having other chemical substance IDs and regulation IDs. Further, the above ratio may serve as an indicator of determining what year the measure expense is equal to the loss amount caused by the loss of sales opportunities when it is assumed that the products corresponding to the amount represented in the shipping amount prediction information 110 are shipped every year. The measure effect calculation part 128 once stores the evaluated ratio in the memory part 130 and then completes the output information 117 according to chemical substance by referring to the information represented in FIG. 17, which has already been stored in the memory part 130, as shown in FIG. 8.

Figure 18:
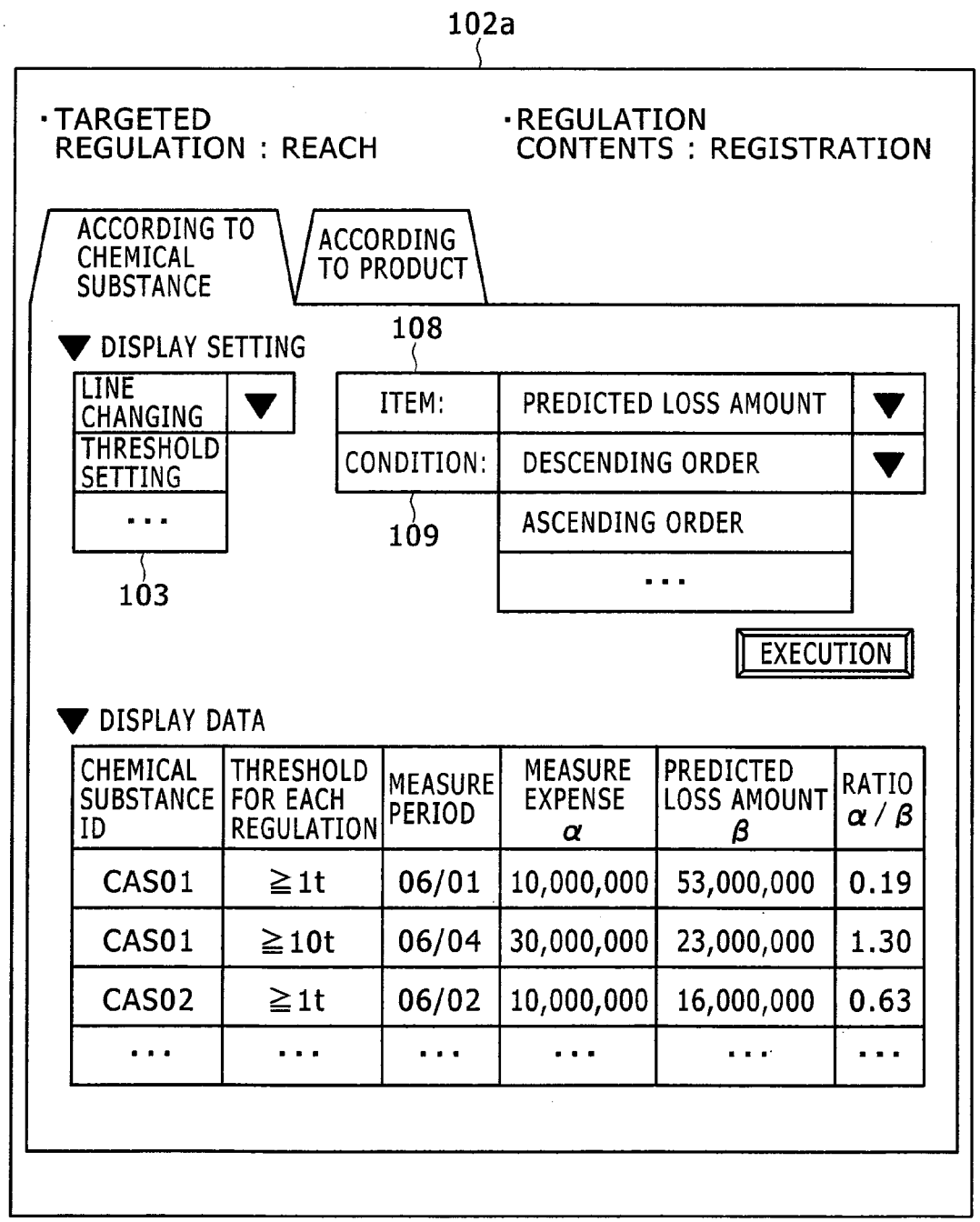
FIG. 18 is an explanatory view illustrating (a first) example of an output screen according to the amount of chemical substance.
Figure 19:
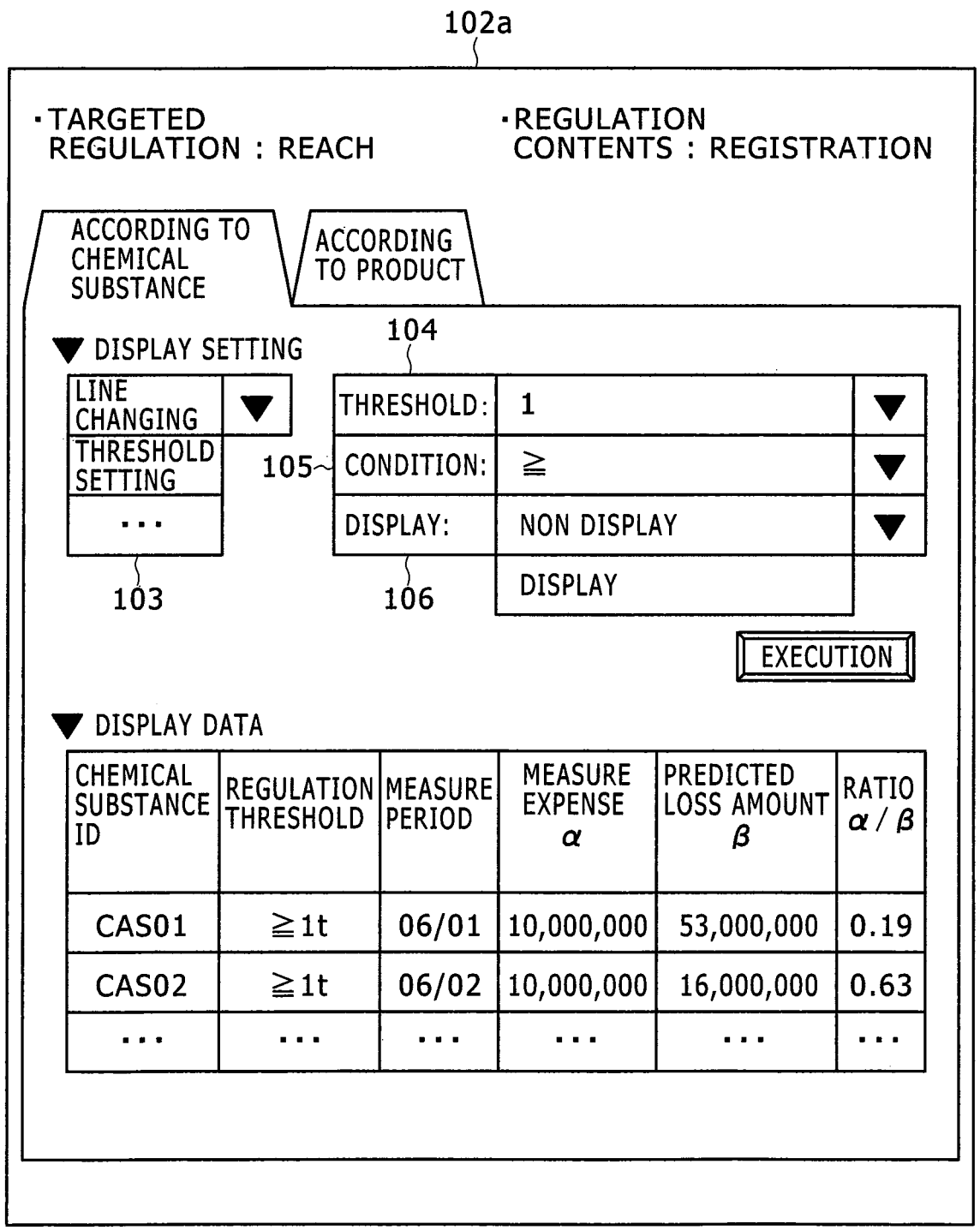
FIG. 19 is an explanatory view illustrating (a second) example of the output screen according to the amount of chemical substance.
Figure 20:
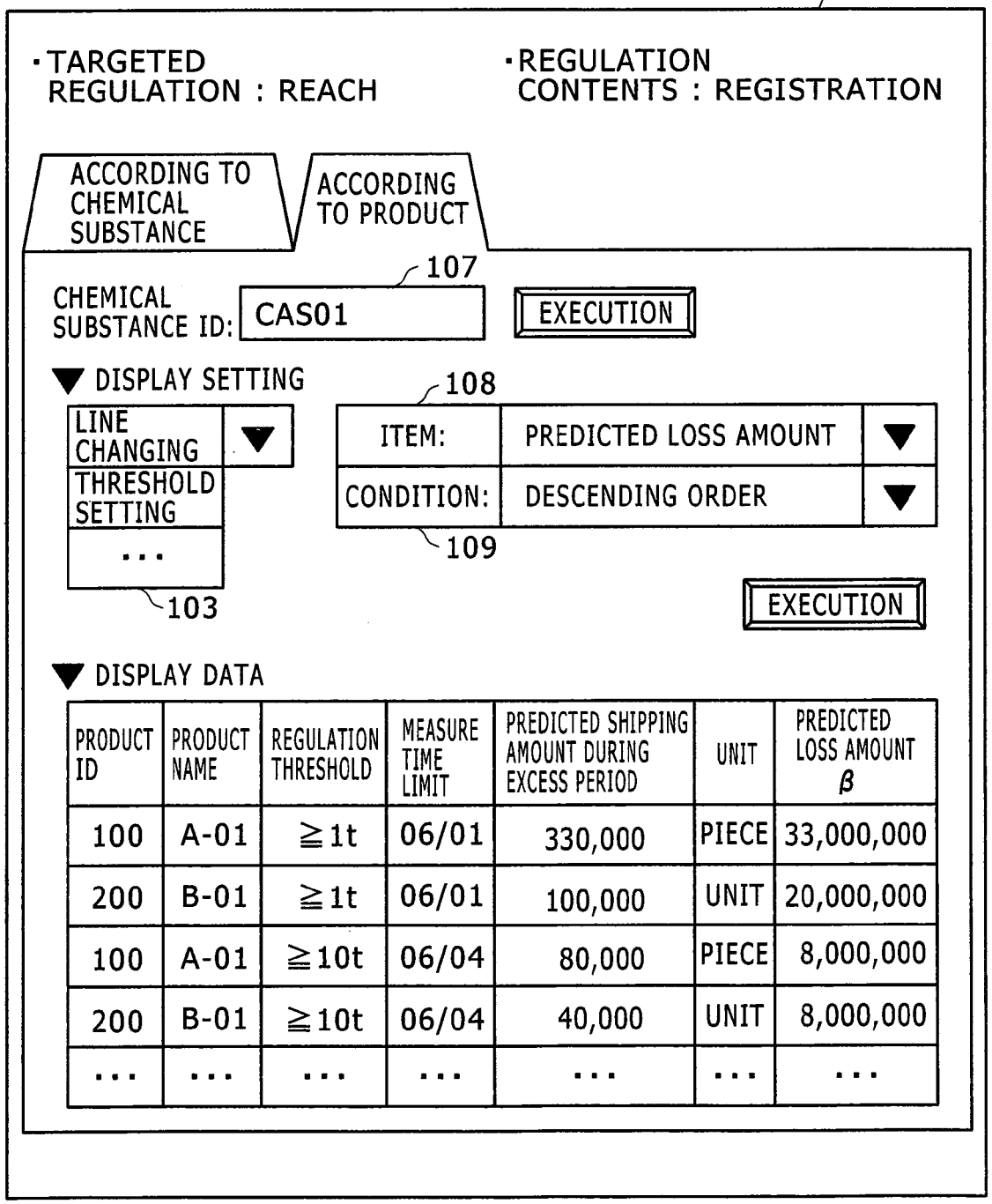
FIG. 20 is an explanatory view illustrating an example of an output screen according to product.

Further, the display control part 129 of the operation unit 120 generates display data based on the results calculated in the above steps S9 and S10, i.e., the output information 116 (see 7) according to product and the output information 117 (see FIG. 8) according to chemical substance, and displays the generated display data on the display device of the I/O unit 101 as shown in FIGS. 18 to 20 (step S11).

For example, the output information 117 according to chemical substance, represented in FIG. 8, is outputted, for example, on a screen 102a shown in FIGS. 18 and 19. The targeted regulation (REACH) and its contents (registration) that have been entered by a user in step S1 are displayed on the upper part of the screen 102a, and the output information 117 according to chemical substance is displayed at the tab "according to chemical Substance" that is located thereunder. On this screen, "line changing" may be performed on each item or "threshold setting" may be performed on the display data, and a display item may be determined based on the threshold. More specifically, the predicted loss amounts are reordered from top down in descending order when "predicted loss amount" is selected in item box 108, and "descending order" in condition box 109, with "reordering" selected in the display setting box 103 on the screen 102a, as shown in FIG. 18. In addition, the information whose ratio (α/β) is less than 1 is only displayed and the information whose ratio (α/β) is equal to or more than 1 is not displayed when "1" is selected in the threshold box 104, "≧" in the condition box 105 and "non display" in the display aspect box 106, with the "threshold setting" selected in the display setting box 103 on the screen 102a, as shown in FIG. 19. Even though it is exemplified herein to make the items have larger value than the threshold based on threshold that is not displayed, it may also be possible to make the items be displayed in visual manner, for example, by displaying the items having larger values than the threshold with lighter color than that of the items having smaller value than the threshold. The display data items are identical to information items included in the output information 117 according to chemical substance, which is represented in FIG. 8, such as the chemical substance ID, the regulation threshold, the measure time limit, measure expense, and the ratio (α/β) between the measure expense α and the predicted loss amount β caused by the loss of sales opportunities.

In addition, the screen 102b is displayed as shown in FIG. 20 when the tab "according to product" is clicked. The targeted regulation (REACH) and its contents (registration) that have been entered by the user are also displayed on the upper part of the screen 102b, and the output information 116 according to product and the chemical substance ID box 107 are displayed thereunder at the tab "according to product". For instance, the information limited to the information on the chemical substance of chemical substance ID "CAS01" is displayed among the output information 116 according to product represented in FIG. 7 when the user enters and executes the chemical substance ID "CAS01" through the I/O unit 101. This determines which products that have not experienced any measures and thus is likely to create any effects, the excess period prediction shipping amount, or the predicted loss amount, thus making it possible to clarify the products that need to be subject to measures. Similarly, "line changing" may also be performed on each item or "threshold setting" may also be performed on the display data on the screen 102b, and a display item may be determined based on the threshold. More specifically, the predicted loss amounts are sorted from top to bottom in descending order when "predicted loss amount" is selected in the item box 108, and "descending order" in the condition box 109, with "reordering" selected in the display setting box 103 on the screen 102b.

As described above, the exemplary embodiment of the present invention may support a decision on whether to execute regulation measures because of being capable of displaying the ratio of the loss amount and the measure expense as well as the amount of loss caused by not executing any regulation measures, the measure expense necessary for measures against regulation. Furthermore, the exemplary embodiment may facilitate to determine the priority of the regulation measures to be executed on a certain product or chemical substance among the regulation measures, each of which is carried out against each of plural products or chemical substances because of being capable of displaying each of the above-mentioned values for each product or chemical substance.

In addition, even though it has been described in the exemplary embodiment to support a decision in respects of European regulation measures for European enterprises, the present invention is not limited to the European regulation measures. It is needless to say that the present invention may also be applied to any regulations and regulation application areas as long as such regulations limit the amount of substances that enter or exit any business entity.

Moreover, even though the exemplary embodiment has focused on the regulation of receiving (import) for the enterprise, which is a business entity, the present invention is not limited thereto, and the present invention may also be applied to the regulation of shipping (export) from the enterprise. For example, the present invention may also be applied to a case where an enterprise belonging to the countries other than Europe exports a product containing a specific chemical substance to Europe and the measurement expense against the European regulation will be paid on behalf of an enterprise in Europe which imports the product. In this case, the "execution decision support device for regulation measures" used by the enterprise belonging to countries other than Europe will calculate the predicted accumulative export amount until each month according to step S5 shown in FIG. 9.

What is claimed is:

1. An execution decision support program which supports a decision on whether to execute procedures with respect to a regulation that limits the amount of a substance which enters and exits a business entity during a predetermined period, the execution decision support program executing a process using a computer comprising:

an acquisition step of acquiring a regulation threshold of the amount of each of one or more regulated substances in the regulation, a predicted shipping amount for each of one or more products of the business entity during each time throughout the predetermined period, the content of a regulated substance contained in each of the one or more products, a profit per unit amount for each of the one or more products, and an expense necessary for the executing of the procedures, from input means of the computer or a storage unit of the computer;

an accumulative substance amount calculation step of using the predicted shipping amount for each of the one or more products throughout the predetermined period and the content of the regulated substance contained in each of the one or more products to evaluate a predicted accumulative receiving substance amount for each regulated substance until each time throughout the predetermined period when the receiving of the regulated substance is regulated for the business entity, and a predicted accumulative shipping amount for each regulated substance until each time throughout the predetermined period when the shipping of the regulated substance is regulated for the business entity;

a substance/time specifying step of specifying a regulated substance exceeding the regulation threshold among one or more regulated substances and a predetermined time exceeding the regulation threshold from the predicted accumulative receiving substance amount for each regulated substance until each time throughout the predetermined period or the predicted accumulative shipping substance amount for each regulated substance until each time throughout the predetermined period that is evaluated in the accumulative substance amount calculation step;

a product specifying step for specifying a product containing the regulated substance specified in the substance/time specifying step among the one or more products;

an excess period shipping amount calculation step for using the predicted shipping amount for each of the one or more products during each time throughout the predetermined period to evaluate the predicted accumulative shipping amount from the specific time specified in the substance/time specifying step to the end of the predetermined period with respect to one or more specific products specified in the product specifying step;

a loss amount calculation step of evaluating a loss amount for each of the one or more specific products when it is assumed that any measures for the regulation are not executed and the specific product is not shipped since the specific period from the predicted accumulative shipping amount of the specific product from the specific time to the end of the year and the profit per unit amount for each of the one or more products, and evaluating the loss amount for each regulated substance by totaling the loss amounts of one or more specific products containing an identical regulated substance among the one or more specific products;

an output step of outputting the loss amount of the regulated substance evaluated in the loss amount calculation step, the measure expense, and/or the ratio of the loss amount and the measure expense for the each regulated substance to output means of the computer; and a measure effect calculation step for evaluating the ratio when the ratio is outputted in the outputting step, wherein the output step includes outputting the time specified in the substance/time specifying step to the output means.

2. The execution decision support program of the regulation measures according to claim 1 the process further comprising:

a reordering receiving step for receiving reordering instruction of numerical values outputted in the outputting step in descending or ascending order through the input means of the computer, the reordering receiving step executed by the computer, wherein the outputting step reorders and displays on the output means the outputted numerical values in descending or ascending order according to the reordering instruction received in the reordering receiving step.

3. The execution decision support program of the regulation measures according to claim 2, wherein the regulation regulates the import amount of a regulated substance in a region that is subject to regulation, and the import of a regulated substance in the business entity is received in the business entity, and the accumulative substance amount calculation step evaluates the predicted accumulative importing substance amount for each regulated substance throughout the predetermined period by using the predicted shipping amount for each of the one or more products until each time throughout the predetermined period and the content of the regulated substance for each of the one or more products.

4. The execution decision support program of the regulation measures according to claim 1, the process further comprising:

a display aspect receiving step of receiving a threshold for a numerical value among items outputted in the outputting step and an applying condition of the threshold through the input means of the computer, the display aspect receiving step executed by the computer, wherein when the display aspect receiving step receives the threshold for the numerical value among the items and the applying condition, the outputting step changes the display aspect of one of an item having a numerical value equal to or more than the threshold and an item having a numerical value less than the threshold to be different from the display aspect of the other according the applying condition.

5. The execution decision support program of the regulation measures according to claim 1, wherein the regulation regulates the import amount of a regulated substance in a region that is subject to regulation, and the import of a regulated substance in the business entity is received in the business entity, and the accumulative substance amount calculation step evaluates the predicted accumulative importing substance amount for each regulated substance throughout the predetermined period by using the predicted shipping amount for each of the one or more products until each time throughout the predetermined period and the content of the regulated substance for each of the one or more products.

6. An execution decision support program which supports a decision on whether to execute procedures with respect to a regulation that limits the amount of a substance which enters and exits a business entity during a predetermined period, the execution decision support program executing a process using a computer comprising:

an acquisition step of acquiring a regulation threshold of the amount of each of one or more regulated substances in the regulation, a predicted shipping amount for each of one or more products of the business entity during each time throughout the predetermined period, the content of a regulated substance contained in each of the one or more products, a profit per unit amount for each of the one or more products, and an expense necessary for the executing of the procedures, from input means of the computer or a storage unit of the computer;

an accumulative substance amount calculation step of using the predicted shipping amount for each of the one or more products throughout the predetermined period and the content of the regulated substance contained in each of the one or more products to evaluate a predicted accumulative receiving substance amount for each regulated substance until each time throughout the predetermined period when the receiving of the regulated substance is regulated for the business entity, and a predicted accumulative shipping amount for each regulated substance until each time throughout the predetermined period when the shipping of the regulated substance is regulated for the business entity;

a substance/time specifying step of specifying a regulated substance exceeding the regulation threshold among one or more regulated substances and a predetermined time exceeding the regulation threshold from the predicted accumulative receiving substance amount for each regulated substance until each time throughout the predetermined period or the predicted accumulative shipping substance amount for each regulated substance until each time throughout the predetermined period that is evaluated in the accumulative substance amount calculation step;

a product specifying step for specifying a product containing the regulated substance specified in the substance/time specifying step among the one or more products;

an excess period shipping amount calculation step for using the predicted shipping amount for each of the one or more products during each time throughout the predetermined period to evaluate the predicted accumulative shipping amount from the specific time specified in the substance/time specifying step to the end of the predetermined period with respect to one or more specific products specified in the product specifying step;

a loss amount calculation step of evaluating a loss amount for each of the one or more specific products when it is assumed that any measures for the regulation are not executed and the specific product is not shipped since the specific period from the predicted accumulative shipping amount of the specific product from the specific time to the end of the year and the profit per unit amount for each of the one or more products, and evaluating the loss amount for each regulated substance by totaling the loss amounts of one or more specific products containing an identical regulated substance among the one or more specific products;

an output step of outputting the loss amount of the regulated substance evaluated in the loss amount calculation step, the measure expense, and/or the ratio of the loss amount and the measure expense for the each regulated substance to output means of the computer;

a measure effect calculation step for evaluating the ratio when the ratio is outputted in the outputting step; and a reordering receiving step for receiving reordering instruction of numerical values outputted in the outputting step in descending or ascending order through the input means of the computer, the reordering receiving step executed by the computer, wherein the outputting step reorders and displays on the output means the outputted numerical values in descending or ascending order according to the reordering instruction received in the reordering receiving step.

7. The execution decision support program of the regulation measures according to claim 6, the process further comprising:

a display aspect receiving step of receiving a threshold for a numerical value among items outputted in the outputting step and an applying condition of the threshold through the input means of the computer, the display aspect receiving step executed by the computer, wherein when the display aspect receiving step receives the threshold for the numerical value among the items and the applying condition, the outputting step changes the display aspect of one of an item having a numerical value equal to or more than the threshold and an item having a numerical value less than the threshold to be different from the display aspect of the other according the applying condition.

8. The execution decision support program of the regulation measures according to claim 6, wherein the regulation regulates the import amount of a regulated substance in a region that is subject to regulation, and the import of a regulated substance in the business entity is received in the business entity, and the accumulative substance amount calculation step evaluates the predicted accumulative importing substance amount for each regulated substance throughout the predetermined period by using the predicted shipping amount for each of the one or more products until each time throughout the predetermined period and the content of the regulated substance for each of the one or more products.

9. An execution decision support program which supports a decision on whether to execute procedures with respect to a regulation that limits the amount of a substance which enters and exits a business entity during a predetermined period, the execution decision support program executing a process using a computer comprising:

an acquisition step of acquiring a regulation threshold of the amount of each of one or more regulated substances in the regulation, a predicted shipping amount for each of one or more products of the business entity during each time throughout the predetermined period, the content of a regulated substance contained in each of the one or more products, a profit per unit amount for each of the one or more products, and an expense necessary for the executing of the procedures, from input means of the computer or a storage unit of the computer;

an accumulative substance amount calculation step of using the predicted shipping amount for each of the one or more products throughout the predetermined period and the content of the regulated substance contained in each of the one or more products to evaluate a predicted accumulative receiving substance amount for each regulated substance until each time throughout the predetermined period when the receiving of the regulated substance is regulated for the business entity, and a predicted accumulative shipping amount for each regulated substance until each time throughout the predetermined period when the shipping of the regulated substance is regulated for the business entity;

a substance/time specifying step of specifying a regulated substance exceeding the regulation threshold among one or more regulated substances and a predetermined time exceeding the regulation threshold from the predicted accumulative receiving substance amount for each regulated substance until each time throughout the predetermined period or the predicted accumulative shipping substance amount for each regulated substance until each time throughout the predetermined period that is evaluated in the accumulative substance amount calculation step;

a product specifying step for specifying a product containing the regulated substance specified in the substance/time specifying step among the one or more products;

an excess period shipping amount calculation step for using the predicted shipping amount for each of the one or more products during each time throughout the predetermined period to evaluate the predicted accumulative shipping amount from the specific time specified in the substance/time specifying step to the end of the predetermined period with respect to one or more specific products specified in the product specifying step;

a loss amount calculation step of evaluating a loss amount for each of the one or more specific products when it is assumed that any measures for the regulation are not executed and the specific product is not shipped since the specific period from the predicted accumulative shipping amount of the specific product from the specific time to the end of the year and the profit per unit amount for each of the one or more products, and evaluating the loss amount for each regulated substance by totaling the loss amounts of one or more specific products containing an identical regulated substance among the one or more specific products;

an output step of outputting the loss amount of the regulated substance evaluated in the loss amount calculation step, the measure expense, and/or the ratio of the loss amount and the measure expense for the each regulated substance to output means of the computer;

a measure effect calculation step for evaluating the ratio when the ratio is outputted in the outputting step; and a display aspect receiving step of receiving a threshold for a numerical value among items outputted in the outputting step and an applying condition of the threshold through the input means of the computer, the display aspect receiving step executed by the computer, wherein when the display aspect receiving step receives the threshold for the numerical value among the items and the applying condition, the outputting step changes the display aspect of one of an item having a numerical value equal to or more than the threshold and an item having a numerical value less than the threshold to be different from the display aspect of the other according the applying condition.

10. An execution decision support program which supports a decision on whether to execute procedures with respect to a regulation that limits the amount of a substance which enters and exits a business entity during a predetermined period, the execution decision support program executing a process using a computer comprising:

an acquisition step of acquiring a regulation threshold of the amount of each of one or more regulated substances in the regulation, a predicted shipping amount for each of one or more products of the business entity during each time throughout the predetermined period, the content of a regulated substance contained in each of the one or more products, a profit per unit amount for each of the one or more products, and an expense necessary for the executing of the procedures, from input means of the computer or a storage unit of the computer;

an accumulative substance amount calculation step of using the predicted shipping amount for each of the one or more products throughout the predetermined period and the content of the regulated substance contained in each of the one or more products to evaluate a predicted accumulative receiving substance amount for each regulated substance until each time throughout the predetermined period when the receiving of the regulated substance is regulated for the business entity, and a predicted accumulative shipping amount for each regulated substance until each time throughout the predetermined period when the shipping of the regulated substance is regulated for the business entity;

a substance/time specifying step of specifying a regulated substance exceeding the regulation threshold among one or more regulated substances and a predetermined time exceeding the regulation threshold from the predicted accumulative receiving substance amount for each regulated substance until each time throughout the predetermined period or the predicted accumulative shipping substance amount for each regulated substance until each time throughout the predetermined period that is evaluated in the accumulative substance amount calculation step;

a product specifying step for specifying a product containing the regulated substance specified in the substance/time specifying step among the one or more products;

an excess period shipping amount calculation step for using the predicted shipping amount for each of the one or more products during each time throughout the predetermined period to evaluate the predicted accumulative shipping amount from the specific time specified in the substance/time specifying step to the end of the predetermined period with respect to one or more specific products specified in the product specifying step;

a loss amount calculation step of evaluating a loss amount for each of the one or more specific products when it is assumed that any measures for the regulation are not executed and the specific product is not shipped since the specific period from the predicted accumulative shipping amount of the specific product from the specific time to the end of the year and the profit per unit amount for each of the one or more products, and evaluating the loss amount for each regulated substance by totaling the loss amounts of one or more specific products containing an identical regulated substance among the one or more specific products;

an output step of outputting the loss amount of the regulated substance evaluated in the loss amount calculation step, the measure expense, and/or the ratio of the loss amount and the measure expense for the each regulated substance to output means of the computer; and a measure effect calculation step for evaluating the ratio when the ratio is outputted in the outputting step, wherein the regulation regulates the import amount of a regulated substance in a region that is subject to regulation, and the import of a regulated substance in the business entity is received in the business entity, and the accumulative substance amount calculation step evaluates the predicted accumulative importing substance amount for each regulated substance throughout the predetermined period by using the predicted shipping amount for each of the one or more products until each time throughout the predetermined period and the content of the regulated substance for each of the one or more products.

* * * * *